F. SHAW.
WHEEL FOR ROAD VEHICLES.
APPLICATION FILED JAN. 18, 1908.

923,205. Patented June 1, 1909.

WITNESSES:
G. V. Symes.
Edward L. George.

INVENTOR.
F. Shaw.
Per Robert F. Phillips.
Attorney.

UNITED STATES PATENT OFFICE.

FEASTER SHAW, OF BISHOP AUCKLAND, ENGLAND.

WHEEL FOR ROAD-VEHICLES.

No. 923,205.   Specification of Letters Patent.   Patented June 1, 1909.

Application filed January 18, 1908. Serial No. 411,538.

*To all whom it may concern:*

Be it known that I, FEASTER SHAW, a subject of the King of Great Britain and Ireland, and resident of 2 Cockton Hill Terrace, Bishop Auckland, in the county of Durham, England, have invented a new and useful Improvement in Wheels for Road-Vehicles, of which the following is a full and complete specification.

This invention relates to wheels for road vehicles, and consists of an improved method of and means for mounting pneumatic tires on the wheels of such vehicles, the object being to facilitate the mounting and dismounting of such tires.

The present invention relates particularly to wheels of that type which are provided with circumferentially divided rims one part of which is attached to the usual wooden felly or a plate carried thereon and the other or detachable part is provided on its inner edge with locking catches to enter corresponding recesses in the attached part or in the plate carried on said felly radially arranged bolts or spring-controlled studs being provided for retaining the parts in engagement, and comprises an improved construction of rim and locking device in combination with an auxiliary rim or band for carrying the complete tire—partially inflated or deflated—when not in position on the wheel.

Figure 1:
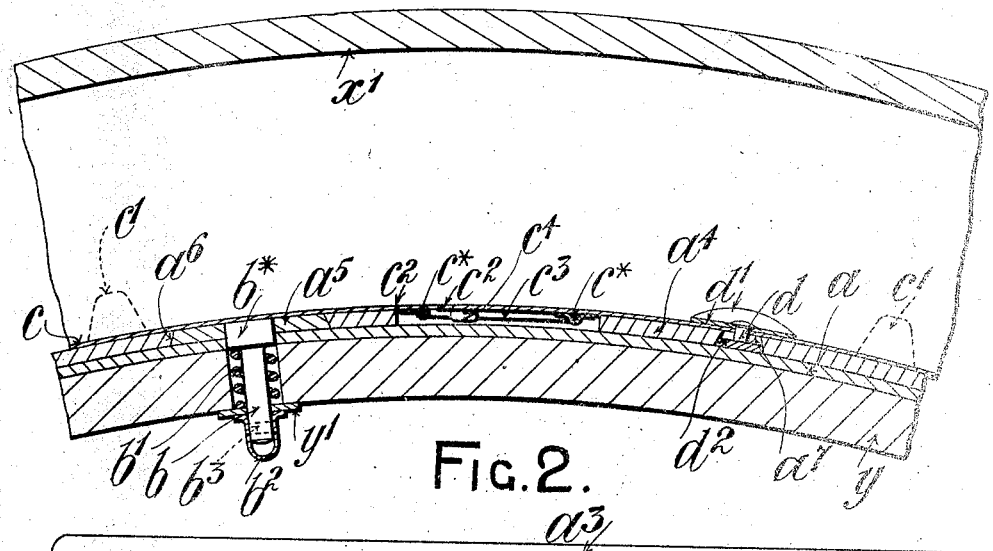
Figure 2:
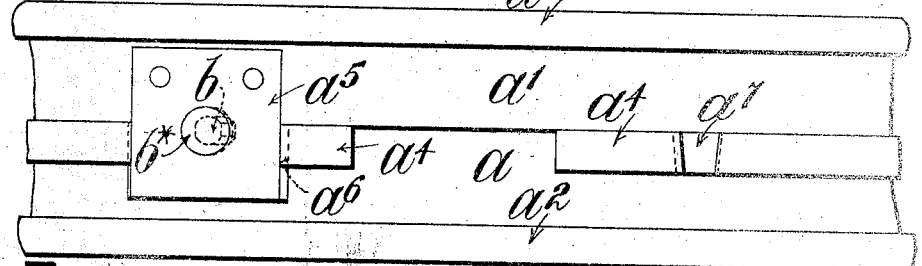
Figure 3:
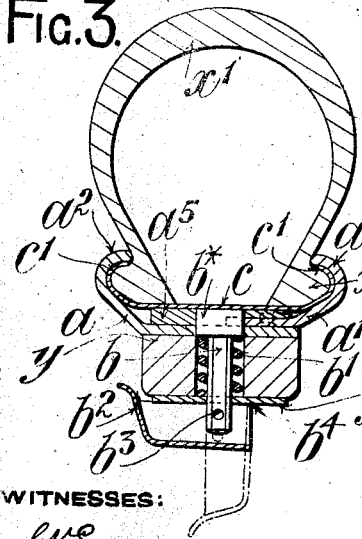
Figure 4:
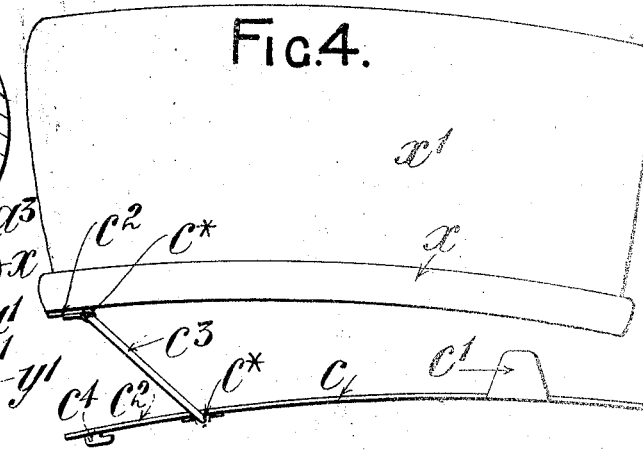

In the accompanying drawing which illustrates this invention, Figure 1 is a broken view in longitudinal section of a wheel constructed according to the present invention, Fig. 2 is a broken view in plan of the divided rim, Fig. 3 is a view in transverse section of the felly and tire, and Fig. 4 is a broken view in side elevation of the auxiliary rim or band.

Throughout the views similar parts are marked with like letters of reference.

The rim of the wheel having in-curved edges adapted to receive the usual thickened edges $x$ of the "clencher" type of tire $x^1$ is formed in two parts $a$ $a^1$ by dividing it in a circumferential direction. The one part $a$ carrying one of the in-curved edges $a^2$ is permanently attached to the felly of the wheel $y$ and the other part $a^1$ carrying the other in-curved edge $a^3$ is adapted to be easily removed from and locked to the felly of the wheel $y$ by a suitable locking device or devices to be presently described. The fixed part of the rim $a$ is preferably formed of a width equal to the width of the felly $y$ and is provided with an outwardly projecting centrally arranged circumferential rib $a^4$ adapted to form an abutment for the inner edge of the removable part $a^1$ of the rim, which latter is provided with one or more transversely arranged thickening pieces $a^5$—corresponding in depth to or slightly less than the height of the circumferential rib $a^4$. These said pieces $a^5$ are each preferably formed with their edges at such an angle to their surface as to form a dovetail cross-section as shown, and are adapted to engage correspondingly formed recesses $a^6$ in the circumferential rib $a^4$. The locking devices consist of a plurality of radially arranged bolts $b$ adapted to be operated from the inner side of the felly $y$. The bolt $b$ passes through the felly $y$ and a hole in the fixed part $a$ of the rim; its head $b^\times$ engages a hole formed in the removable part $a^1$ of the rim and the thickening piece $a^5$ carried thereby. The bolt $b$ is controlled by means of a compression spring $b^1$ acting between the underside of the head $b^\times$ and a plate $y^1$—through which the free end of the bolt passes—secured to the inner side of the felly $y$.

The shank of the bolt is provided with flats or otherwise shaped and the hole in the plate $y^1$ is correspondingly shaped in order to prevent the bolt from turning around. A lever $b^2$—shaped at its one end so as to be easily operated by the fingers—is pivoted at $b^3$ to the free end of the bolt. The free end $b^4$ of this lever beyond its point of pivot $b^3$ forms its fulcruming point by engaging the plate $y^1$. The bolt in its disengaged position is shown in dot-and-dash lines on Fig. 3. The complete tire $x^1$ deflated or partly inflated, is carried on an auxiliary rim or band $c$ adapted to be slipped on the wheel over the fixed part $a$ of the rim and before the removable part $a^1$ is placed in position. This auxiliary rim $c$ comprises a circumferentially expansible and contractible band provided with a plurality of in-curved hooks or lips $c^1$ on each of its edges. These hooks or lips $c^1$ are adapted to engage the thickened edges $x$ on the tire cover and hold them in position and allow—if desirable—the air tube—not shown on the drawings—to be partially inflated before the complete tire is put into position on the wheel. The hooks or lips $c^1$ lie within the in-curved edges $a^2$ $a^3$ of the two-part rim $a$ $a^1$ when the tire $x^1$ is in position on the wheel. It is essential that the hooks or lips $c^1$ shall be positioned or of such a number and form as to merely hold the thickened edges of the deflated or only partially inflated tire cover in place when off the rim and allow the said thickened edges to properly engage the in-curved edges $a^2$ $a^3$ of the rim to take the whole of the lateral strain exerted by the thickened edges of the cover when the tire is inflated and in use.

The band $c$ is preferably made contractible and expansible by dividing it transversely and joining the ends $c^2$ $c^2$ together by means of a link $c^3$ or plate hinged at $c^\times$ to each part of the band, the arrangement being such that the ends $c^2$ $c^2$ of the band overlap each other in the contracted position (see Fig. 4) for a distance equal to or greater than the length of said link $c^3$ or plate and when the band is expanded (see Fig. 1) with its tire cover $x^1$ in position and the air tube inflated the said band $c$ is incapable of contracting or only contracting within limits defined by the play given to the hinge joints $c^\times$. A hooked stud $c^4$ or the like is provided to facilitate pulling the band $c$ into its contracted position. The rib $a^4$ is cut away as shown in Figs. 1 and 2 in order to accommodate the link $c^3$ and stud $c^4$.

Security bolts $d$ may sometimes be employed, in which case they are formed with compound wedge-shaped heads $d^2$ projecting through the inner surface of the band $c$ and adapted to engage correspondingly wedge-shaped transverse recesses $a^7$ formed in the circumferential rib $a^4$ of the fixed part $a^1$ of the rim. The heads $d^2$ of said bolts are so formed that on mounting the auxiliary rim or band $c$ carrying the partially inflated tire, by sliding it laterally over the fixed part $a$ of the wheel rim, the security bolts $d$ will be radially moved, causing the plates $d^1$ on their free ends to draw down the edges $x$ of the tire cover $x^1$ and secure them to prevent the tire cover $x^1$ creeping, and at the same time the band $c$ will be securely locked to the rim, so preventing any movement taking place between the band $c$ and tire $x^1$ and rim $a$ $a^1$.

What I claim as my invention, and desire to secure by Letters Patent is:—

1. A two-part circumferentially divided rim for elastic tires of road vehicles, comprising a fixed part of a width equal to the felly, a centrally arranged circumferential rib formed on said fixed part, said rib being adapted to form an abutment for the inner edge of the removable part, wedge-shaped thickening pieces transversely arranged on said removable part and adapted to engage correspondingly shaped recesses formed in said rib, radially arranged spring-controlled bolts adapted to pass through said wedge-shaped thickening pieces and the fixed part and felly so as to hold and lock the parts of the rim together, and means for readily operating said bolts and holding them open or in a disengaged position.

2. In a pneumatic tired wheel for road vehicles having a two-part circumferentially divided rim with incurved edges, an auxiliary removable band adapted to be carried within said rim, a hinged toggle joint connecting the two ends of said band together so as to make it circumferentially contractible and expansible when not within said rim, and a plurality of incurved hooks or lips formed on the edges of said band adapted to temporarily hold the usual thickened edges of the tire cover together when off the rim and in a deflated condition yet allow said thickened edges to properly and directly engage the usual incurved edge of the rim when the tire is in position thereon, as set forth.

In testimony whereof I have hereunto signed my name in the presence of two subscribing witnesses.

FEASTER SHAW.

Witnesses:
W. H. NIXON,
J. E. MARYHAN.